United States Patent
Agrawal et al.

(10) Patent No.: US 6,935,925 B1
(45) Date of Patent: Aug. 30, 2005

(54) SYSTEM, METHOD, AND APPARATUS FOR IN-SITU ACOUSTIC EMISSION MONITORING OF BURNISH HEADS IN PRODUCTION DURING MAGNETIC MEDIA CLEANING OR BURNISH PROCESS

(75) Inventors: Parul Agrawal, Saratoga, CA (US); Bradley Frederick Baumgartner, Los Banos, CA (US); Norman Chu, San Francisco, CA (US); Charles Lee, San Jose, CA (US); Tony Mello, San Jose, CA (US); Christopher Ramm, San Jose, CA (US); Bob Clyde Robinson, Hollister, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 10/881,145

(22) Filed: Jun. 30, 2004

(51) Int. Cl.$^7$ .............................................. B24B 49/00
(52) U.S. Cl. ............................................ 451/8; 451/63
(58) Field of Search ................................ 451/5, 6, 8, 9, 451/41, 63, 290; 73/105; 29/90.1, 603.16

(56) References Cited

U.S. PATENT DOCUMENTS

| | | |
|---|---|---|
| 5,220,470 A | 6/1993 | Ananth et al. |
| 5,488,857 A | 2/1996 | Homma et al. |
| 5,675,462 A | 10/1997 | Ayabe |
| 5,824,920 A | 10/1998 | Sugimoto et al. |
| 5,917,726 A * | 6/1999 | Pryor ........................ 700/95 |
| 5,939,624 A | 8/1999 | Smith, Jr. |
| 5,942,680 A | 8/1999 | Boutaghou |
| 6,290,573 B1 | 9/2001 | Suzuki |
| 6,296,552 B1 * | 10/2001 | Boutaghou et al. ........... 451/41 |
| 6,503,132 B2 | 1/2003 | Ekstrum et al. |
| 6,526,639 B2 | 3/2003 | Duan et al. |
| 6,536,265 B1 | 3/2003 | Hanchi et al. |
| 6,580,572 B1 * | 6/2003 | Yao et al. ..................... 360/25 |

FOREIGN PATENT DOCUMENTS

| | | |
|---|---|---|
| JP | 55077037 | 6/1980 |
| JP | 56083843 | 7/1981 |
| JP | 1310861 | 12/1989 |
| JP | 9016593 | 1/1997 |
| JP | 11037748 | 2/1999 |

OTHER PUBLICATIONS

"Zero Pitch Burnish Head", IBM Technical Disclosure Bulletin, Sep. 1992, 92A 62522/RO8920217, p. 421.

"A Correction Technique for Magnetic Disk Fly Heights", IBM Technical Disclosure Bulletin, Feb. 1990, 90A 63578/RO8870240, Pub. No. 310.

(Continued)

*Primary Examiner*—Jacob K. Ackun, Jr.
(74) *Attorney, Agent, or Firm*—Bracewell & Giuliani LLP

(57) ABSTRACT

An in-situ technique for the acoustic emission monitoring of burnish heads while they are cleaning or burnishing magnetic media is described. The burnishing process is monitored and controlled to identify interaction or contact between the head and media due to, for example, burnish head damage, substrate curvature problems, and lube pick-up problems. A piezoelectric sensor is mounted on the burnish arm that holds the burnish heads. When head-disk interaction occurs, stress waves travel through the head to the sensor and an amplified signal is gathered in a tester database as an acoustic emission. Abnormal conditions will trigger an unusual emission that is detected to trigger an alert.

17 Claims, 3 Drawing Sheets

OTHER PUBLICATIONS

"Intelligent Burnishing System Using a Cognizant Burnish Head", IBM Technical Disclosure Bulletin, Apr. 1987, 87A 62638/49-240 P300/SA8850248, Pub. No. 276.

"Method of Testing Burnishing Magnetic Heads", IBM Technical Disclosure Bulletin, Sep. 1984, 84A 62267/49-240 P15/GE8820051, p. 2315.

* cited by examiner

SYSTEM, METHOD, AND APPARATUS FOR IN-SITU ACOUSTIC EMISSION MONITORING OF BURNISH HEADS IN PRODUCTION DURING MAGNETIC MEDIA CLEANING OR BURNISH PROCESS

BACKGROUND OF THE INVENTION

1. Technical Field

The present invention relates in general to improved processing of disk drive components and, in particular, to an improved system, method, and apparatus for monitoring a condition of a burnish head during a magnetic media cleaning and/or burnish process.

2. Description of the Related Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, two or three disks are stacked vertically on a common spindle that is turned by a disk drive motor at several thousand revolutions per minute (rpm).

A typical HDD also includes an actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions (air bearing design) on its air bearing surface (ABS) that enables the slider to fly at a constant height close to the disk during operation of the disk drive. A slider is associated with each side of each platter and flies just over the platter's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

To successfully achieve file performance, the heads must fly steadily at a given fly height over the disk with minimal variations. Since the variations in fly height are dependent on the various sensitivities of the fly height to the process parameters as well as the variability of the parameters, tight process control is mandatory to minimize such variations. Common dominant process parameters affecting fly height include gram load, pivot location, crown and etch depths.

The presence of asperities on the surfaces of the disks is a major factor that can have a deleterious effect on the performance of disk drives. Asperities can contact the magnetic head as it flies at its normal height in a disk drive. For this reason, a glide test is performed on finished disks to detect asperities that might contact the magnetic head during operation. In the test, a special glide head containing a piezoelectric transducer (PZT) is flown over a disk at an altitude or height that is below the normal drive fly height. Glide head contact with an asperity creates a PZT voltage response that generally scales with increasing size of the asperity. If the voltage response exceeds a predetermined level, the disk is rejected.

One way to reduce such disk defects is to burnish the disks. A thin film disk head burnish process removes the disk surface debris and asperities that are introduced by pre- and post-sputter processes. As stated above, such debris and asperities can reduce disk glide yield and cause other significant disk drive performance problems. The burnish process is utilized on thin film media to remove asperities and loose particles before it can go for glide and magnetic certification tests. Burnishing is typically performed in two steps: a tape burnish process followed by a head burnish. Presently, the burnish heads themselves are not monitored or evaluated while in operation. In particular, there have been no attempts to maintain the status of burnish heads at the media glide and magnetic certification testers. Thus, it would be desirable to be able to better understand and evaluate the condition of burnish heads during operation.

SUMMARY OF THE INVENTION

One embodiment of a system, method, and apparatus for in-situ, acoustic emission (AE) monitoring of burnish heads during manufacturing production, while they are cleaning and/or burnishing magnetic media, is described. The present invention effectively monitors and controls the burnishing process to identify interaction or contact between the head and media due to burnish head damage, substrate curvature problems, excessive lubricant pick-up by the slider, etc. This technique utilizes a piezoelectric sensor that is mounted on the burnish arm that holds the burnish heads. Whenever any head-disk interaction occurs, the stress waves travel through the burnish head to the sensor and the amplified signal is gathered in the tester database as an AE.

This AE information is utilized to serve several objectives. If everything is operating normally while a burnish head is flying above the media, there will not be a significant signal and the AE amplitude will be at a noise floor level. However, a number of activities may generate an unusual signal that is detected by the system. These abnormal activities include, for example: (a) the head is picking up significant amount of lubricant that affect flyability; (b) the head is damaged; (c) substrate curvature or chamfer problems; and (d) the disk has an unusual amount of contamination or mounds. When an event such as these is detected, a system and/or operator is alerted to take action regarding the problem, such as eliminating the damaged burnish head. This could prevent damaging significant number of disks and help tremendously in controlling the quality of the disks.

In one embodiment, this in-situ monitoring technique utilizes the AE sensors that detect head disk interaction. The sensors are attached on the block arm that holds the burnish heads. In the event of head disk interaction, the stress wave travels via suspension to the head block and the sensors picks up the signal. In one version, the signal is amplified and monitored with a hardware and acquisition system, such as a preamplifier and an amplifier, and the RMS voltage output value is fed to the data acquisition system.

For production monitoring, the signal is picked up at the ID, MD and OD tracks for 1,080 sectors on the media or disk. The disk is identified by converting the cassette number and the slot number into a "Morse code." The intensity of the signal is shown as a stripe next to the disk code and a color scale scheme is used to represent the intensity of the signal. Log files are also generated that contain the cassette number, slot number, glide test information, test time, and average value of signals obtained at the ID, MD and OD locations. This method is useful in detecting (a) burnish head interaction with the substrate ski jumps; (b) suspension problems due to wrong alignment and dragging of the heads; and (c) significant lubricant interaction with burnish heads.

The present invention can help in determining the radial accessibility of burnish head at the outermost radius of the disk. This method helps optimize the burnish head traverse radius on the disk and avoid its interaction with disk curvature and chamfer.

For hybrid burnish sliders, the present invention may be used for spin-down characterization in order to decide the operating point for sweeping as well as burnishing process. For example, hybrid burnish heads may be characterized to decide the operating velocities for sweeping and contact for each burnish head at the manufacturing floor. This feature is analogous to using a bump test for glide heads to decide their operating velocities.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
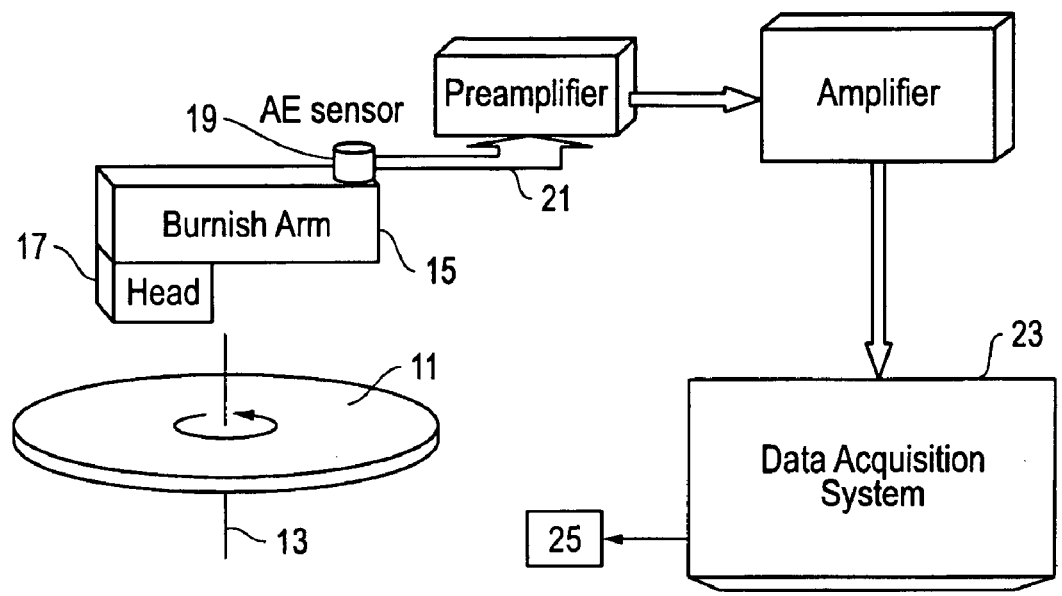
FIG. 1 is a schematic diagram of a burnish head in-situ acoustic emission monitoring system for magnetic media and is constructed in accordance with the present invention.

Referring to FIG. 1, one embodiment of a system, method, and apparatus for in-situ, manufacturing production monitoring of burnish heads while they are cleaning and/or burnishing magnetic media is disclosed. The present invention comprises a magnetic media 11 that rotates about an axis 13 and a burnish arm 15 having a burnish head 17 mounted thereto. The burnish arm 15 positions the burnish head 17 adjacent and in proximity to the magnetic media 11, and pivotally moves the burnish head 17 relative to the rotating magnetic media 11 for cleaning or burnishing the magnetic media 11.

A sensor 19 is mounted to the burnish arm 15 for detecting physical contact between the burnish head 17 and the magnetic media 11. The sensor emits a signal 21 to identify a relative magnitude of contact between the burnish head 17 and the magnetic media 11. A data acquisition system 23 receives and processes the signal 21 from the sensor 19. In one embodiment, the sensor 19 comprises a piezoelectric sensor for detecting stress waves traveling from the burnish head 17 through the burnish arm 15 to the sensor 19, and the signal is an acoustic emission (AE). In one embodiment, the signal 21 feeds an RMS voltage output value to the data acquisition system 23, and the data acquisition system 23 utilizes a preamplifier 27 and an amplifier 29 to amplify the signal 21.

One type of burnish head flies in proximity to the disks and is primarily used for cleaning the particles and loose contamination therefrom. This type may not necessarily aid in burnishing the asperities, such that any type of continuous contact above the noise floor is bad. These heads cannot make a steady contact with the disks. In normal situations, the AE output for these heads would be at the noise floor. Any output above the noise floor for these heads indicates a problem due to unnecessary head-disk interaction. For example, the system shown in FIG. 1 detects the interaction and signals an alert 25 (e.g., alerts the operator) for preventive measures.

Figure 2:
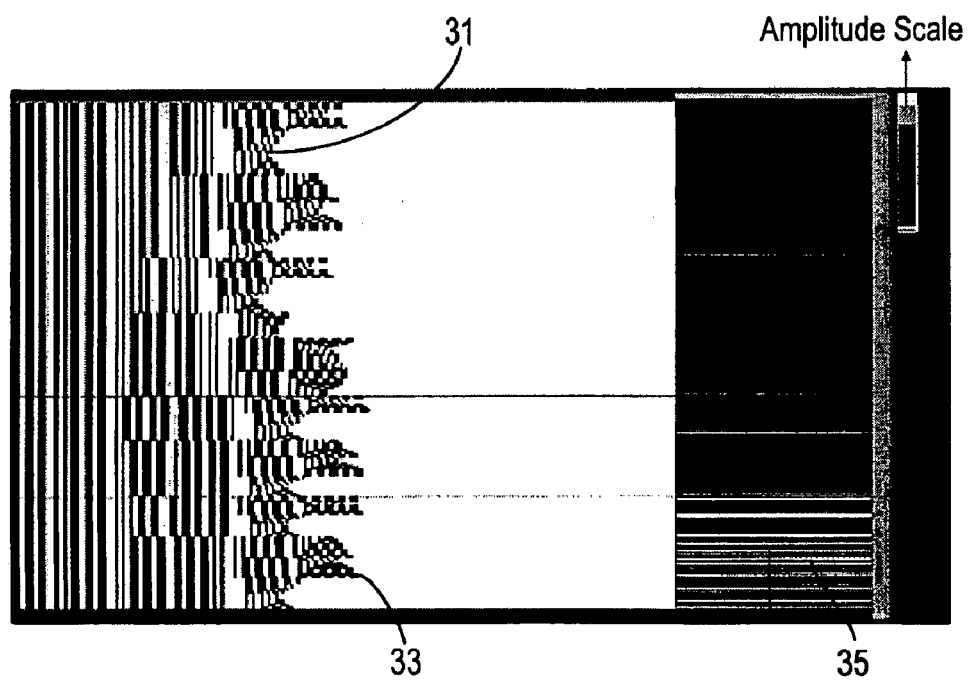
FIG. 2 is an acoustic emissions plot generated by the system of FIG. 1 and is constructed in accordance with the present invention.

As shown in FIG. 2, the data acquisition system 23 distinguishes between normal operating conditions 31 and abnormal operating conditions 33 between the magnetic media 11 and the burnish head 17 in order to detect a problem with the burnish head 17. FIG. 2 represents a typical graph obtained from the system of the present invention depicting dozens of magnetic media 11 tested by a single burnish head 17. Each line 35 on the right shows the high value of an acoustic emission (AE) signal at an outer diameter (OD) location on one of the disks. Such a consistent and large number of lines 35 indicate problems with the burnish head 17. For example, the sensor 19 may detect damage to the burnish head 17, interaction with radial curvature of the disks near their outer diameters, and accumulation of lubricant on the burnish head 17. An alert 25, such as a visual, audible, or electronic signal via computer, to an operator is generated by the system regarding a problem with the burnish head 17.

Figure 3:
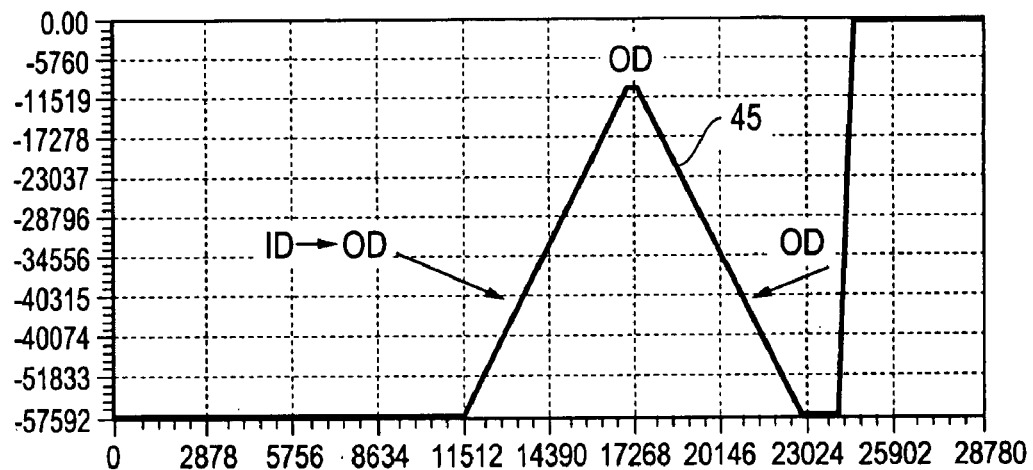
FIG. 3 is an acoustic emissions plot for scanner positioning generated by the system of FIG. 1 and is constructed in accordance with the present invention.
Figure 3:
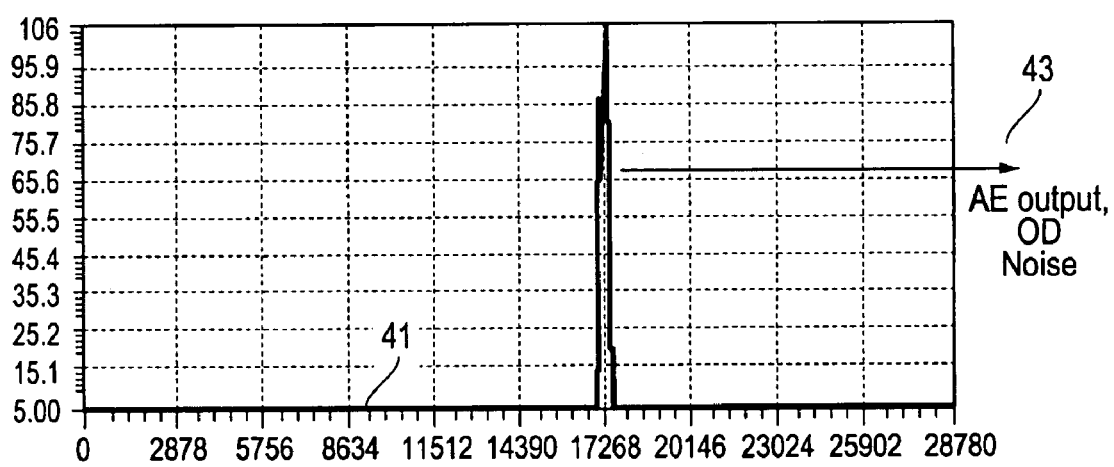

Comparing FIGS. 2 and 3, the system monitors normal operating conditions 31, which emit a baseline amplitude 41 (lower plot in FIG. 3) at a noise floor level, and abnormal operating conditions 33, which emit a spike 43 in amplitude that is significantly greater than the noise floor level. The spike 43 happens to coincides at the OD of the magnetic media 11, as shown in the upper plot 45 that depicts the radial position of the burnish head 17 relative to the magnetic media 11.

A second category of head makes steady contact. These heads are used in contact mode to burnish asperities. Hybrid/ contact or hybrid heads are capable to flying as well as making steady contact on the disks. Hence, they could be used for cleaning as well as burnishing small asperities. The velocity of the heads is an important parameter when contact with the disks is established so that the operating points for flying as well as contact mode can be decided when they are used in production. Typically AE output from these heads is low amplitude and steadily increasing as velocity is decreased. If the AE output makes a sudden high amplitude jump then the head is not stable.

Figure 4:
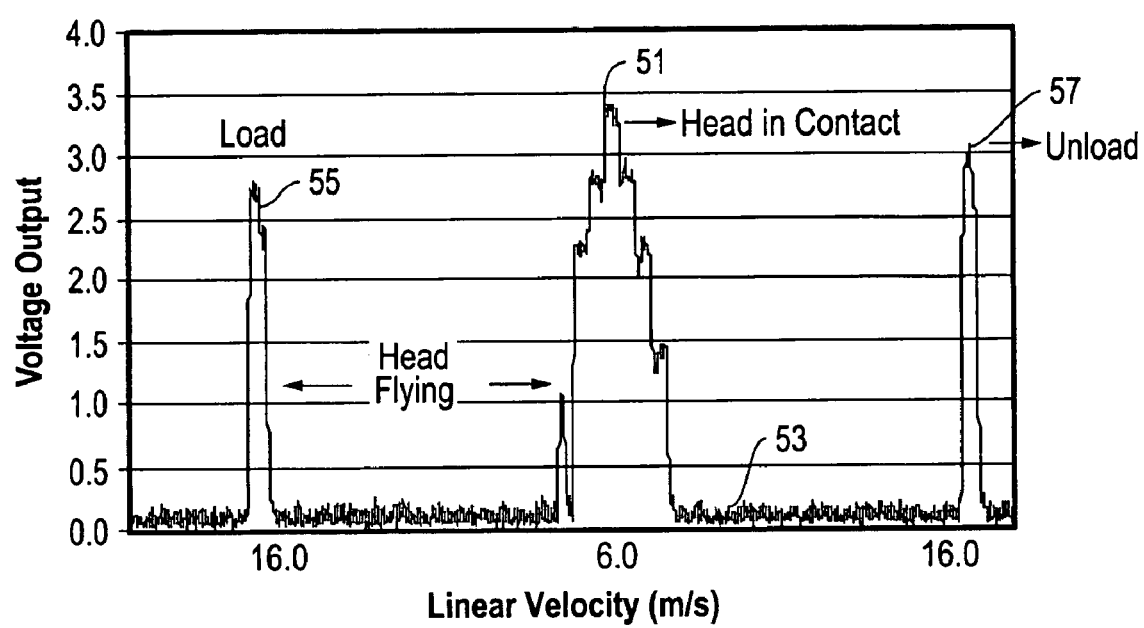
FIG. 4 is a plot of spin-down and spin-up characterizations of burnish head in the system of FIG. 1 and is constructed in accordance with the present invention.

Referring now to FIG. 4, the present invention also aids in determining the operating velocity for flying 53 and contact mode 51 of hybrid burnish heads. The operating velocity of a hybrid burnish head is characterized by: flying the head 17 in proximity to the magnetic media 11, and then reducing a speed of the magnetic media 11 until the sensor 19 detects contact with the magnetic media 11 that exceeds the baseline amplitude 53.

The present invention also comprises a method of in-situ monitoring of burnish heads 17 while they are cleaning or burnishing magnetic media 11. The method comprises: providing a magnetic media 11 (FIG. 1) and a burnish arm 15 having one of the burnish heads 17 described herein; rotating a magnetic media 11 about an axis 13; cleaning and/or burnishing the magnetic media 11 with the burnish head 17; detecting contact 43 (FIG. 3) between the burnish head 17 and the magnetic media; identifying a relative magnitude of said contact between the burnish head 17 and the magnetic media 11; and distinguishing between normal and abnormal operating conditions 31, 33 (FIG. 2) between the magnetic media 11 and the burnish head 17 to detect a problem with the burnish head 17.

The method further comprises detecting at least one of damage to the burnish head 17, interaction of burnish head with disk's radial curvature (e.g., determining a farthest OD radius on the disk that the burnish head can reach without interacting with disk chamfer or radial curvature of the disk), and accumulation of lubricant on the burnish head 17. The method may comprise using a piezoelectric sensor 19 for detecting stress waves traveling from the burnish head 17 through the burnish arm 15 to the sensor 19. The signal 21 may be an acoustic emission detected by a data acquisition system 23 to receive and process a signal 21 from the piezoelectric sensor 19. The data acquisition system 23 emits a baseline amplitude 41 at a noise floor level in response to normal operating conditions 31, and a spike 43 in amplitude in response to abnormal operating conditions 33 that is significantly greater than the noise floor level.

In addition, the method characterizes an operating velocity 51 (FIG. 4) of the burnish head 17 by flying the burnish head 17 in proximity to the magnetic media 11, reducing a speed of the magnetic media 11 until the sensor 19 detects contact with the magnetic media 11. The procedure assists in determining the operating velocity for proximity flying as well as velocity for steady contact for every head used in manufacturing.

While the invention has been shown or described in only some of its forms, it should be apparent to those skilled in the art that it is not so limited, but is susceptible to various changes without departing from the scope of the invention.

What is claimed is:

1. A system for in-situ monitoring of burnish heads while they are cleaning magnetic media, comprising:
   a magnetic media that rotates about an axis;
   a burnish arm having a burnish head mounted thereto, the burnish arm positioning the burnish head adjacent the magnetic media and moving the burnish head relative to the rotating magnetic media for cleaning the magnetic media;
   a sensor mounted to the burnish arm for detecting contact between the burnish head and the magnetic media, the sensor also emitting a signal to identify a relative magnitude of said contact between the burnish head and the magnetic media; and
   a data acquisition system for receiving and processing the signal from the sensor to distinguish between normal and abnormal operating conditions between the magnetic media and the burnish head in order to detect a problem with the burnish head.

2. The system of claim 1, wherein the sensor detects at least one of damage to the burnish head, interaction of burnish head with disk radial curvature, and accumulation of lubricant on the burnish head.

3. The system of claim 1, wherein the sensor comprises a piezoelectric sensor for detecting stress waves traveling from the burnish head through the burnish arm to the sensor, and the signal is an acoustic emission.

4. The system of claim 1, wherein normal operating conditions emit a baseline amplitude at a noise floor level, and abnormal operating conditions emit a spike in amplitude that is significantly greater than the noise floor level.

5. The system of claim 4, wherein the burnish head is a hybrid/contact burnish head having an operating velocity characterized for proximity flying and steady contact by: flying the burnish head in proximity to the magnetic media, reducing a speed of the magnetic media until the sensor detects contact with the magnetic media that exceeds the baseline amplitude.

6. The system of claim 1, further comprising an alert generated by the system regarding a problem with the burnish head.

7. The system of claim 1, wherein the signal feeds an RMS voltage output value to the data acquisition system, and the data acquisition system utilizes a preamplifier and an amplifier to amplify the signal.

8. A method of in-situ monitoring of burnish heads while they are cleaning or burnishing magnetic media, comprising:
   (a) providing a magnetic media and a burnish arm having a burnish head;
   (b) rotating a magnetic media about an axis;
   (c) cleaning or burnishing the magnetic media with the burnish head;
   (d) detecting contact between the burnish head and the magnetic media;
   (e) identifying a relative magnitude of said contact between the burnish head and the magnetic media; and
   (f) distinguishing between normal and abnormal operating conditions between the magnetic media and the burnish head to detect a problem with the burnish head.

9. The method of claim 8, wherein step (f) comprises detecting at least one of damage to the burnish head, interaction of burnish head with disk radial curvature at outer diameter, and accumulation of lubricant on the burnish head.

10. The method of claim 8, wherein step (d) comprises using a piezoelectric sensor for detecting stress waves traveling from the burnish head through the burnish arm to the sensor, and the signal is an acoustic emission, and steps (e) and (f) comprise using a data acquisition system to receive and process a signal from the piezoelectric sensor.

11. The method of claim 8, further comprising emitting a baseline amplitude at a noise floor level in response to normal operating conditions, and emitting a spike in amplitude in response to abnormal operating conditions that is significantly greater than the noise floor level.

12. The method of claim 11, wherein the burnish head is a hybrid/contact burnish head, and further comprising characterizing an operating velocity of the hybrid/contact burnish head for proximity flying and steady contact by: flying the burnish head in proximity to the magnetic media, reducing a speed of the magnetic media until the sensor detects contact with the magnetic media that exceeds the baseline amplitude.

13. The method of claim 8, further comprising generating an alert regarding a problem with the burnish head.

14. The method of claim 8, further comprising feeding an RMS voltage output value to the data acquisition system, and using a preamplifier and an amplifier to amplify a signal thereof.

15. The method of claim 8, further comprising determining a farthest point on the disk that the burnish head can reach without interacting with disk chamfer or radial curvature of the disk.

16. An apparatus for in-situ monitoring of burnish heads while they are cleaning or burnishing magnetic media, comprising:
   a burnish arm adapted to support a burnish head thereon for positioning the burnish head adjacent a magnetic media and cleaning or burnishing the magnetic media;
   a sensor mounted to the burnish arm adapted to detect contact between the burnish head and the magnetic media, the sensor emitting a signal to identify a relative magnitude of said contact between the burnish head and the magnetic media, and the sensor comprising a piezoelectric sensor for detecting stress waves traveling from the burnish head through the burnish arm to the sensor, and the signal is an acoustic emission;
   a data acquisition system for receiving and processing the signal from the sensor to distinguish between normal and abnormal operating conditions between the magnetic media and the burnish head in order to detect a problem with the burnish head, wherein normal operating conditions emit a baseline amplitude at a noise floor level, and abnormal operating conditions emit a spike in amplitude that is significantly greater than the noise floor level, the data acquisition system being adapted to generate an alert regarding a problem with the burnish head; and wherein
   the signal feeds an RMS voltage output value to the data acquisition system, and the data acquisition system utilizes a preamplifier and an amplifier to amplify the signal.

17. The apparatus of claim 16, wherein the sensor is adapted to detect at least one of damage to the burnish head, problems with the interaction of the burnish head with disk radial curvature, and accumulation of lubricant on the burnish head.

* * * * *